Nov. 22, 1966          E. W. MALONE          3,286,524
THERMAL MEASURING APPARATUS
Filed June 4, 1963          6 Sheets-Sheet 1
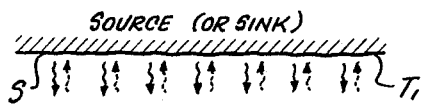
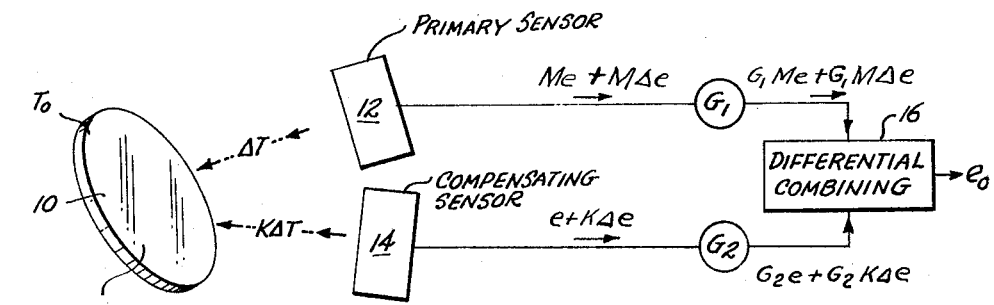
*Fig. 1.*
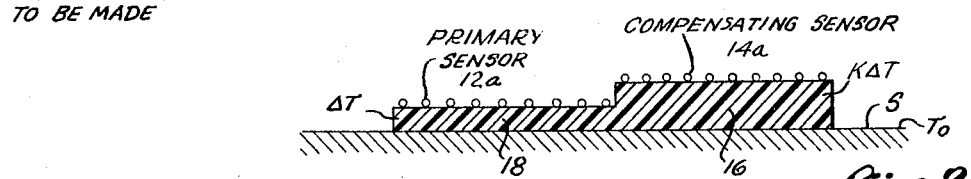
*Fig. 2.*
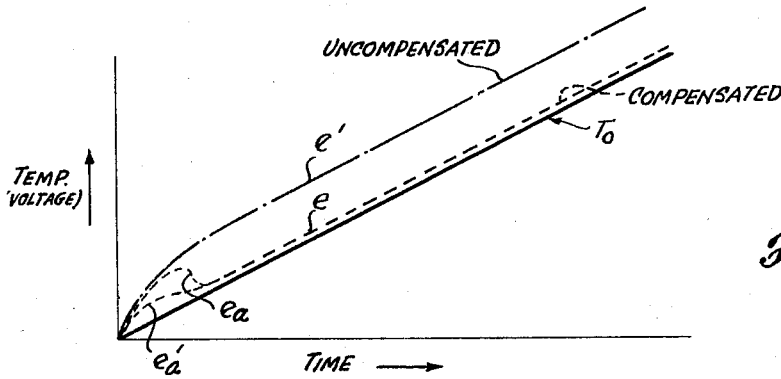
*Fig. 3.*
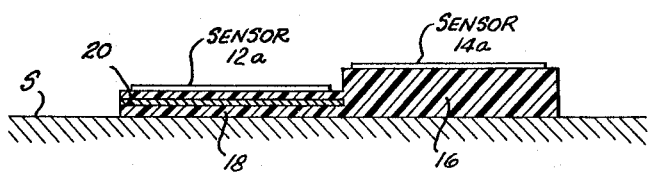
*Fig. 4.*
INVENTOR.
ERLE W. MALONE
BY Reynolds & Christensen
ATTORNEYS

INVENTOR.
ERLE W. MALONE
BY
ATTORNEYS

Nov. 22, 1966  E. W. MALONE  3,286,524
THERMAL MEASURING APPARATUS
Filed June 4, 1963  6 Sheets-Sheet 3

NOMINAL VALUES:
$R_a = R_b = R_c$
(COPLANAR AND CONCENTRIC TO POINT OF MEASUREMENT OF $T_0$)

INVENTOR.
ERLE W. MALONE
BY
Reynolds & Christensen
ATTORNEYS

Nov. 22, 1966  E. W. MALONE  3,286,524
THERMAL MEASURING APPARATUS
Filed June 4, 1963  6 Sheets-Sheet 4
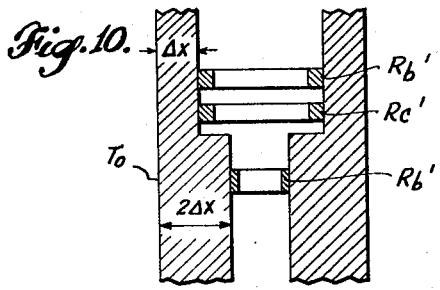
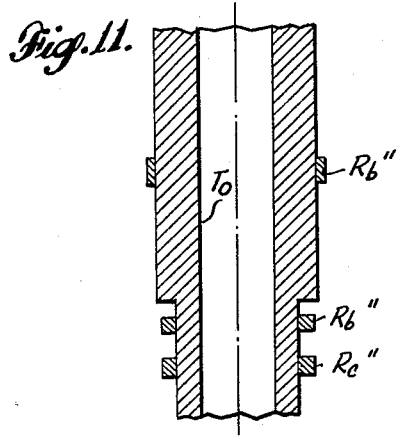
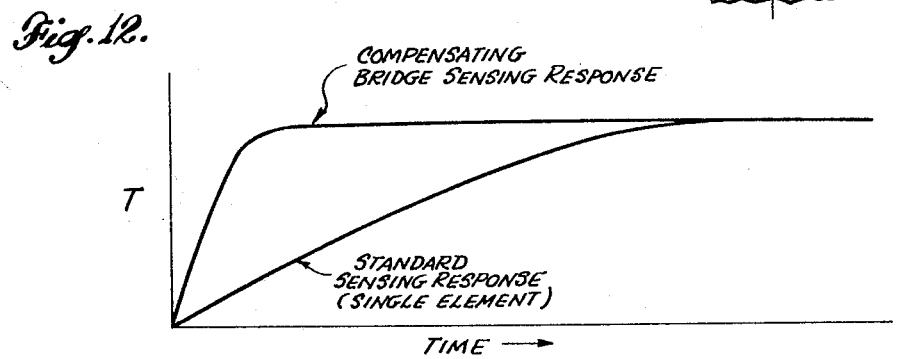
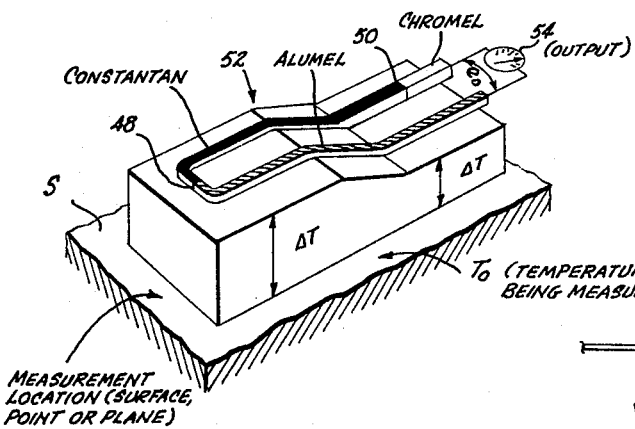
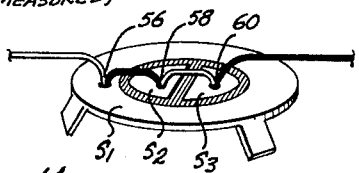
INVENTOR.
ERLE W. MALONE
BY
Reynolds & Christensen
ATTORNEYS

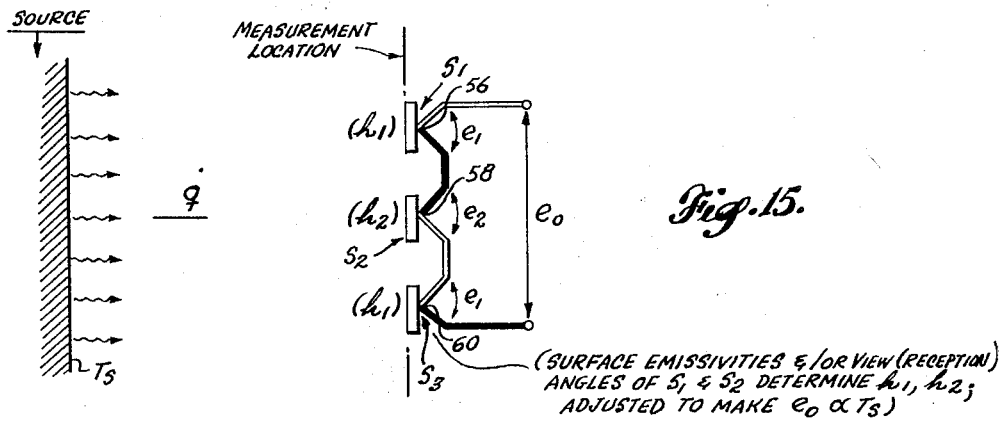
*Fig. 15.*
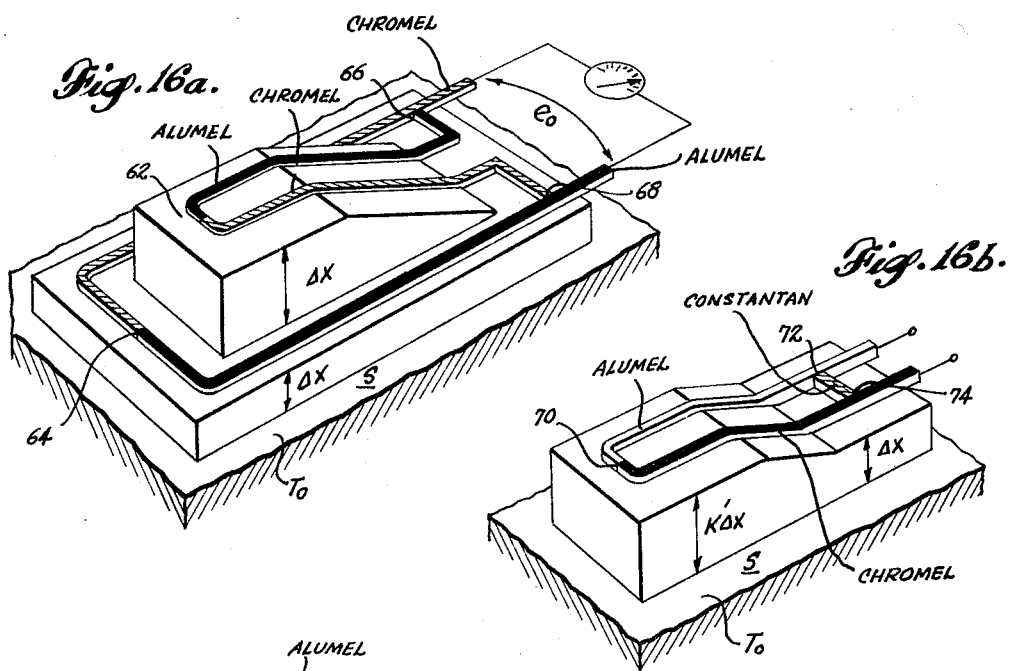
*Fig. 16a.*
*Fig. 16b.*
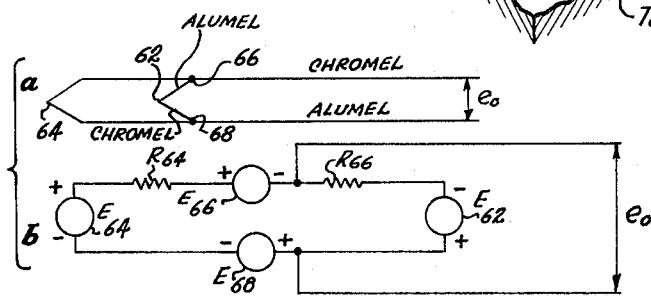
*Fig. 17.*
INVENTOR.
ERLE W. MALONE
BY
Reynolds & Christensen
ATTORNEYS Nov. 22, 1966   E. W. MALONE   3,286,524
THERMAL MEASURING APPARATUS
Filed June 4, 1963   6 Sheets-Sheet 6

INVENTOR.
ERLE W. MALONE
BY
Reynolds & Christensen
ATTORNEYS

3,286,524
THERMAL MEASURING APPARATUS
Erle W. Malone, Seattle, Wash., assignor to The Boeing Company, Seattle, Wash., a corporation of Delaware
Filed June 4, 1963, Ser. No. 286,131
17 Claims. (Cl. 73—341)

The present application is a continuation-in-part of Serial No. 142,055 filed October 2, 1961 now abandoned.

This invention relates to improved devices primarily for measuring temperature of a surface and secondarily for measuring heat flow to or from the surface, although the invention also has application to measurements with respect to any selected physical location as hereinafter will be more fully explained. More particularly the invention is concerned with measuring and responsively following rapid changes of temperature or other thermal condition, with compensation for errors introduced by an overall thermal transfer coefficient ratio differing from unity, such as result from thermal gradients in intervening insulation representing a thermal impedance which separates the sensing transducer or transducers from the surface or measurement location. The invention is herein illustratively described primarily by reference to its application to surface temperature and heat transfer measurements; however, it will be recognized that it has broader application as well and that the disclosed embodiments are illustrative but not exhaustive of possible modifications and variations of the apparatus.

Brownlee et al. Patent 2,798,399 discloses the principle of measuring temperature of matter which is inaccessible by reason of its remoteness or of its location behind a thermal barrier, involving the steps of placing a thermal impedance member adjacent an outer surface of the barrier, measuring the temperature of such outer surface (or of the outer surface of the member) measuring temperature drop across the attached member, and utilizing these two measurements to determine temperature of the matter located at the inner surface of the barrier. The ratio of thermal impedances of the barrier and of the attached member is utilized in interpolating temperature difference. The present invention provides novel apparatus and techniques for measurement not only of temperature but also, or alternatively, of heating rate, and more especially of effecting reliable measurements of temperatures and heating rates which change rapidly so as to require virtually instantaneous response of the cooperating thermoelectric elements as a unitary combination. Further this invention provides for direct-reading indication of temperatrue or heating rate under conditions which may vary so rapidly as to preclude use of apparatus requiring manual or mechanical adjustments in order to establish or restore circuit balance before each reading is taken. A principal object of this invention, therefore, is to provide devices with extremely short response time for measuring changing temperature or changing heat flow with respect to any physical location, such as a point, a plane, or a surface, or within or upon any medium. A highly important objective is to provide apparatus which senses temperature or heat flow accurately after only a very short heat diffusion period and without necessity of waiting for attainment of thermal equilibrium in the total system. A related object is to provide a means for substantially eliminating error transients in a multi-thermoelectric element transducer system operating on the principle of cancellation of measurement errors in cooperating thermoelectric elements, so as to permit measuring accurately with such elements under transient conditions.

A further object is to provide such thermal measuring apparatus which in the case of temperature-sensive resistance transducers may be driven hard (i.e., may be subjected to relatively heavy drive currents) in comparison with previous devices employing resistance transducers, without impairment of measurement accuracy due to heating of the resistance from the quiescent current flow.

Still another object is to provide such measuring apparatus which will not be limited to any particular configuration or group of configurations of the sensing elements, of their supports, or of the medium in or upon which the transducer apparatus is mounted.

Another object is to provide such a system wherein the effects of shunting of current through thermal impedance or insulation layers, which tend to break down or become more highly conductive at elevated temperatures, are minimized by inherent compensating factors resulting from the combined electrical and physio-thermal arrangements of those elements in accordance with features of the invention.

Further, the invention, when applied to sensing elements of the thermocouple type, overcomes the usual difficulties with errors caused by thermocouple conductors conducting heat to or from the measurement surface, by an imperfect thermal junction between the measurement surface and the thermocouple elements, or by the presence of insulation between the measurement surface and the sensing thermocouple. Furthermore, the present apparatus is easier to construct, has a faster response time and is not as sensitive to nonlinear heat flow phenomena as previous devices.

One application of the invention is in resistance thermometers. In general, a temperature-sensitive resistance element was cemented to the surface to be measured for temperature and was thereby necessarily separated from the surface by an insulating cement layer constituting a thermal impedance which gave rise to a thermal gradient temperature error. A second, preferably similar resistance element is applied to the same surface, having a predetermined overall response characteristic different than that of the primary element, and the output responses of the two elements are so combined that errors due to thermal gradients cancel out. In accordance with this invention the characteristics of the thermoelectric elements and associated heat transfer means are such that their respective products of thermal capacity and thermal impedance or their respective ratios of thermal capacity and "overall thermal transfer coefficient" (later defined), are made substantially equal in order thereby to eliminate differences in diffusion time as a factor in the responsiveness of the system to rapid thermal changes.

In one embodiment of this invention a simple direct-reading bridge-type galvanometer circuit is employed, involving use of three such resistance elements. Two of these are separated from the measurement surface by a predetermined thermal impedance whereas the third is separated from the measurement surface by a larger thermal impedance, usually approximately twice that for the first two mentioned elements. These three resistances are then connected in three arms of the bridge circuit. In the remaining arm a fourth resistance is connected which is of a temperature-insensitive material or which is physically located apart from the measurement surface so as to be unaffected by variations in temperature thereof. Not only does such a bridge circuit provide accurate and rapid measurement of surface temperature but it may also be adapted, in conjunction with additional bridge circuit connections, to measure heat flux or flow to or from the measurement surface. These measurements may be made separately or simultaneously as desired.

In another application of the invention thermocouple type sensing elements are used, involving a primary thermocouple having one value of thermal impedance or overall thermal transfer coefficient, and compensating thermocouple means having an effectively different thermal impedance or overall thermal transfer coefficient, so related to the first thermocouple that measurement errors cancel out when the thermocouple outputs are combined. In one such installation compensation is achieved by flow of internal circulation currents in a thermocouple series loop circuit.

In other embodiments compensation is achieved by thermocouple error voltage components bucking each other out with thermocouples connected in series between the output conductors from the transducer apparatus.

In still other embodiments amplification may be used and, if it is used, is taken into account in combining the resultant primary and compensating thermocouple (or other temperature-sensitive electrical element) channel signals differentially for error cancellation purposes.

The term thermal impedance as herein used means the ration of $\Delta T$ (i.e. temperature difference between the point of measurement and the point where temperature is being measured) to $\dot{q}$ (i.e time rate of heat flow). The term is used in the sense of the overall or net condition as opposed to the specific or unit area condition, and is the inverse of thermal conductance or thermal transfer coefficient (a term which may be more expressive in the case of radiant systems—such as in FIGURE 15 later described). As thus used, the term thermal impedance takes into account the net effect of such factors as conductance of the environment or support medium separating the sensor from the point whose temperature is being measured, and losses due to conduction, convection and radiation (e.g., these losses may usually be disregarded). See Principles of Engineering Heat Transfer by Giedt, Jan. 1957 by D. Van Nostrand Co. (pp. 50–52).

In general, the invention requires use of primary and compensating sensing elements. These must both be referenced to the same condition being measured and, in order to achieve instantaneous response, must be interrelated such that the product of thermal capacity and thermal impedance of one sensor is equal to that of the other. Combining of their outputs must provide for cancellation of the measurement error increments of both while preserving the pure or basic measurement response of the primary element in the combined output. In case one sensing element channel has gain different from that of the other, or in case one sensing element responds differently than does the other to stimulus from the condition being measured, these known or predetermined factors and relationship must be considered, along with the known or predetermined differences between the thermal impedances of the respective elements, in interpreting the combined output of the system.

These and other features, objects and advantages of the invention will become more fully evident from the following description thereof by reference to the accompanying drawings.

FIGURE 1 is a diagram illustrating the principle of the invention in a basic aspect.

FIGURE 2 is a simplified diagram showing in cross section a sensing transducer combination depicting a technique for surface temperature measurements upon which the invention is based.

FIGURE 3 is a graph illustrating the compensation effect achieved by use of a separate compensating sensor whose output is combined with that of the primary sensor.

FIGURE 4 is a simplified view in cross section of an embodiment of the invention, represented by a modified transducer combination incorporating means to suppress or minimize transient effects due to difference between thermal diffusivity of the two sensors and the respective transfer media through which they are respectively coupled to the measurement reference surface.

FIGURE 10 is a sectional diagram of a transducer arrangement for measuring temperature at the exterior surface of a cylindrical object.

FIGURE 11 is a simplified sectional diagram of a transducer arrangement for measuring surface temperature within a tube or duct.

FIGURE 12 is a graph showing the improved response characteristic (i.e., quicker response) of a bridge circuit incorporating this invention, as compared with the response time of a conventional resistance thermometer or equivalent uncompensated device.

FIGURE 13 is a simplified isometric view of a temperature measuring device using two thermal junctions in the transducer head.

FIGURE 14 is an isometric view of a modified transducer head incorporating three absorption plates and thermocouples cooperating with each and connected in circuit to measure temperature of the plane in which the plates are mounted, or of a selected related measurement location having a predetermined thermal impedance for which compensation is desired.

FIGURE 15 is a schematic electrical diagram of the arrangement shown in FIGURE 14.

FIGURE 16A is an isometric view of a modified thermocouple sensing head employing four thermal junctions and utilizing circulating current flow within the loop formed by the interconnected thermal junctions as a means of compensating for thermal gradient between a primary thermal junction and the reference surface.

FIGURE 16B is a similar view of a modified arrangement also using current compensation technique for the described purpose of FIGURE 16A.

FIGURE 17 shows the equivalent circuit diagrams associated with the compensated transducer arrangement of FIGURE 16A.

Figure 4A:
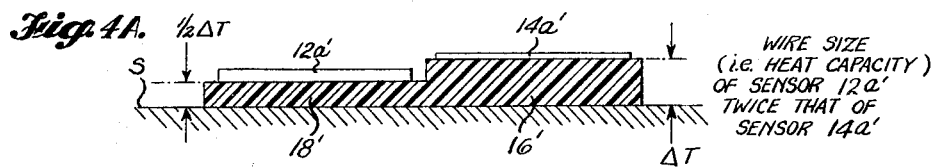
FIGURE 4A is a modification of FIGURE 4.

Referring to FIGURE 1, a generalized problem is depicted wherein the thermal condition being measured is the temperature $T_0$ of a location 10 which is represented as a surface but may in fact be a point or plane in space. It is assumed that the temperature $T_0$ is influenced by the temperature of a remote source of sink S and the problem is to provide a transducer means which may be mounted upon or may be fixed in relation to the surface 10 without materially influencing its temperature yet which will accurately sense that temperature despite the existence of an unknown temperature gradient $\Delta T$ between the two or despite any other equivalent unknown affecting the thermal impedance between the transducer means and the measurement location. Moreover, the problem is to sense temperature as instantaneously as possible so that even if temperature changes rapidly the apparatus will be capable of following the changes.

As shown a primary sensor 12 having an unknown thermal impedance in relation to location 10 producing a thermal gradient $\Delta T$ therebetween, is supplemented by a compensating sensor 14 having of a related thermal impedance K times that of the primary sensor. Sensor 12 may have the same thermoelectric sensitivity as sensor 14, but for purposes of generalization its electro-motive force output in response to the thermal condition is assumed to be M times that of sensor 14, disregarding differences in thermal impedances. The thermal capacity of sensor 12 may be equal to or different from that of sensor 14, in either case adjusting by suitable means the respective thermal impedances of the sensors in relation to the location 10. Considering thermal impedances also, sensor 12 will produce an output $Me+M\Delta e$ while sensor 14 produces an output $e+K\Delta e$. Now if the two outputs are combined differentially the result is $e_0$, or $Me+M\Delta e-e-K\Delta e=e_0$. If M is assumed equal to the number two and K is assumed equal to two, then $e_0=e$. This represents the simplest and the preferred case by which combined output is made equal to primary sensor output compensated for the error ($\Delta e$) due to thermal gradient between the sensor and measurement location. The relationship may be expressed as one in which the thermoelectric sensitivities of the respective sensors are related in the inverse ratio of their thermal impedances.

However, in the general case the above design assumption may not readily be attained directly, due to inability to make K equal to M. To satisfy the general case, therefore, it is further assumed that there is or may be a gain $G_1$ in the primary sensor channel and a gain $G_2$ in the compensating sensor channel. These gains in the simple case are both equal to one, but in the general case may be unequal. So assuming, the output of the illustrated differential combining device 16, $e_0$, is now expressed as $$e_0=G_1Me+G_1M\Delta e-G_2e-G_2K\Delta e$$

Now in order to satisfy the condition that $e_0$ be made equal to the primary sensor output $e$ or related to it in a known way the unknown $\Delta e$ factors must be eliminated. To achieve this it is necessary that $$G_1M\Delta e-G_2K\Delta e=0$$

or that $$G_1M=G_2K \qquad (I)$$

Under those conditions, $$G_1Me-G_2e=0$$

and $$e_0=e(G_1M-G_2)$$

Thus it is also necessary to assume that $G_1M-G_2$ is a known or constant value, i.e.

$$G_1M-G_2=N \qquad (II)$$

in order to interpret $e_0$ directly in terms of response sensitivity of the primary sensor. These conditions (I and II) are readily determined or satisfied since the gains $G_1$ and $G_2$ are known, and the thermal impedance ratio K and the relative sensitivity ratio M are readily set by design. Alternatively it is possible by empirical methods to begin with fixed values of K and M and achieve compensation by adjusting $G_1$ and $G_2$ in order to satisfy conditions I and II.

In FIGURE 2 there is shown for purposes of illustrating the principle of error cancellation referred to in the above-mentioned Brownlee et al. patent, a physical sensor arrangement to measure temperature $T_0$ of surface S. It comprises a primary sensor 12a separated from surface S by a thermal impedance 18, and a compensating sensor 14a separated from the surface by a thermal impedance 16 which is K times that of impedance 18. A thermal gradient $\Delta T$ occurs in the insulation layer 18 and a gradient $K\Delta T$ in the layer 16. If in the simplest case K is two one-half and the sensor 12a has twice the thermoelectric sensitivity of sensor 14a, and if the sensing channel gains are equal, the combined output $e_0$ will equal the voltage response $e$ of primary sensor 12a as desired. FIGURE 3 illustrates the surface temperature variation as a function of time when the surface is subjected to uniform heating rate, and further shows the manner in which compensated output voltage $e$ of the described sensing arrangement closely follows this variation in comparison with the output $e'$ of an uncompensated resistance thermometer or similar device.

In FIGURE 3 it is observed that the initial portion $e_a$ of graph line $e$ follows a transient variation, requiring a certain period for stabilization of the response characteristic in conformity with the temperature curve $T_0$. This transient response is found to be due to a difference between thermal diffusivity (i.e., the ratio of thermal conductivity to density times specific heat of the sensor materials) of the two sensors 12a and 14a if they are of equal thermal capacities while their respectively associated thermal impedances 18 and 16 are in the ratio of 1 to 2. That is, sensor 12a responds before sensor 14a. In accordance with this invention, this transient condition may be largely overcome by forming the sensor systems in such manner that the product of thermal capacity and thermal impedance of one sensor is equal to the similar product of the other sensor. For example, as shown in FIGURE 4 the thermal impedance 18 is loaded with a conductive layer, such as a thin layer of copper, which stores heat but does not materially affect the thermal impedance value, other things being equal. Assuming the thermoelectric elements 14a and 12a are similar (i.e., have equal thermal capacities) the delaying effect introduced by heat capacity of the conductive layer permits diffusion of heat to sensor 14a at about the same time it reaches sensor 12a, so that even though thermal impedances 16 and 18 differ in the required ratio (depending upon the ratio of response sensitivities of the sensors) for compensation of steady-state error, the necessary conditions will also be met to compensate for transient error, as depicted by the modified curve portion $e'_a$. If on the other hand the respective sensors differ, as in the case of FIGURE 2, transient error compensation may be achieved by unbalancing the thermal capacities of the thermoelectric elements. For instance if, in FIGURE 2, K is two, the wire size (volume) of sensor 14a will be made one-half that for sensor 12a (ignoring conduction, convection and radiation losses, which may usually be neglected). FIGURE 4A illustrates such an arrangement, wherein parts corresponding to those in FIGURE 4 bear the same reference numerals primed.

It will be understood that these same principles governing relationship of thermal capacity and thermal transfer coefficient of the sensors will apply in the following description of additional types of devices for measuring temperature or heating rate.

Figure 7A:
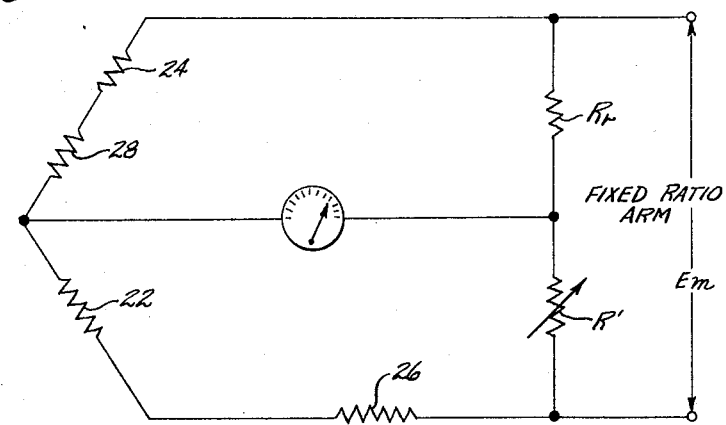
FIGURES 7A and 7B are further modifications.
Figure 5:
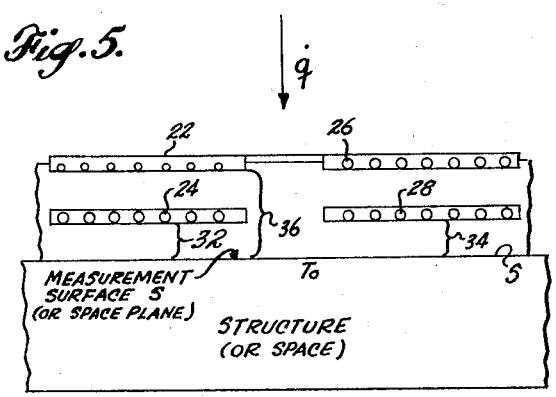
FIGURE 5 is a simplified sectional diagram of a four-element sensor adapted for use in a direct-reading galvanometer type bridge circuit.
Figure 6:
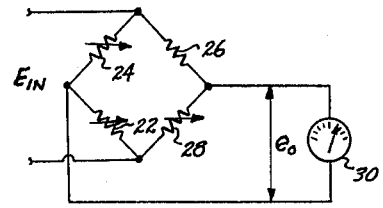
FIGURE 6 is a schematic diagram of such a bridge circuit.

In FIGURES 5 and 6 a bridge circuit sensing arrangement is employed, wherein four different temperature sensitive resistance elements 22, 24, 26 and 28 are connected in the four arms of a bridge circuit subjected to input voltage $E_{in}$ applied across two diagonally opposite corners and producing output voltage $e_0$ across the two remaining corners for application to a galvanometer 30. The measurement surface temperature $T_0$ caused by heat flow $q$ produces equal thermal gradients in the equal thermal impedances 32 and 34 disposed between the surface S and the nearest two resistors 24 and 28. Temperature $T_0$ produces twice the thermal gradient between surface S and resistor 22, because of its insulation 36 being of a thickness correspondingly greater. The fourth resistor 26 is constant, i.e., is of a type not sensitive to temperature and is mounted in the same transducer head purely as a matter of convenience. It may be physically and thermally separated from the surface S if desired as depicted in FIGURE 7, wherein it is mounted in the meter box 30a. In this example, the desired transient responsiveness is achieved by causing the thermal capacity of element 22 to be half that of either of elements 24 and 28, assuming the thermal impedance of element 22 is twice that of the other two elements on the basis that the thermal impedance value 36 is twice that of either 32 or 34.

Referring to FIGURE 6, it will be evident that the bridge is balanced at some temperature and that an increase in temperature will cause an unbalance with a consequent voltage output $e_0$ related to surface temperature $T_0$. The temperature error $\Delta T$ inherent in resistor 24 due to insulation layer 32, which may comprise a layer of adhesive which bonds the resistance grid to surface S, is cancelled out by the doubled error inherent in resistor 22 and by the error inherent in resistor 28 which keeps the bridge properly balanced. Moreover other and different combinations of cements and thicknesses of those cements may be used to generate the necessary primary and compensating temperature gradient errors in the transducer assembly in order to maintain the balance. These resistances may comprise thin wire grids (of different wire diameters, if necessary in order to achieve the required equality of products of thermal capacity times thermal impedance) mounted on insulation backings which in turn are cemented in place, taking into consideration the bridge balance compensation required to overcome thermal gradient errors as disclosed.

In FIGURE 7 it will be noted that four conductors as a minimum are required leading between the sensor unit and the outside circuit apparatus including the power source and meter. This assumes that one of the power leads also functions as the lead between resistors 24 and 26. In FIGURE 7A, comprising a two-arm bridge, the number of lead conductors may be reduced to three. Moreover, the sensitivity or gain of this modified arrangement may be varied by the method of varying one ($R_r'$) of the fixed-ratio arm resistances $R_r$ and $R_r'$ in order to balance the bridge with any of different values chosen for resistance 26.

Figure 7B:
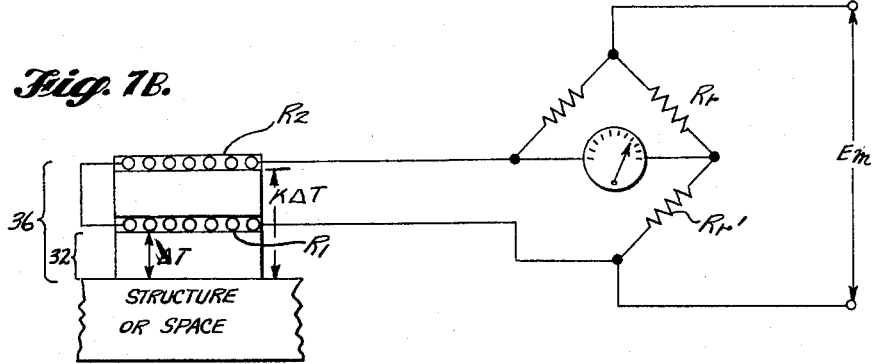
Figure 7:
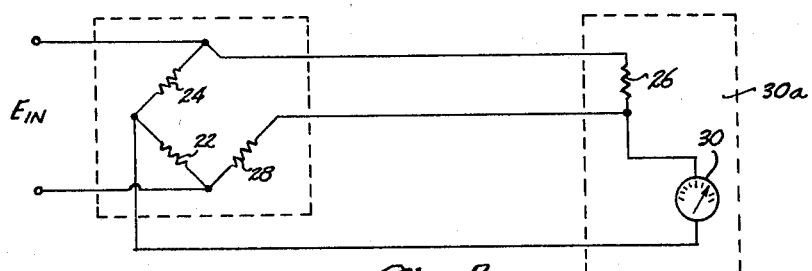
FIGURE 7 is a similar schematic diagram of a bridge circuit in which one of the resistance arms is located physically remotely from the transducer combination.

In the modification shown in FIGURE 7B only two lead conductors are required between the outside instrumentation and the sensor unit proper, which in this instance comprises just two resistance elements $R_1$ and $R_2$. This is achieved by employing one resistance, such as $R_1$, with a positive temperature coefficient and the other, $R_2$, with a negative temperature coefficient. $R_2$ may, for example, comprise any semi-conductor material having a negative temperature coefficient, i.e., resistance increases with decreasing temperature. In order to satisfy conditions I and II above, the following relationships must obtain:

$$K = \frac{\alpha 1}{\alpha 2}$$

where $\alpha_2$ is the negative temperature coefficient of the semi-conductor $R_2$ and $\alpha_1$ is the positive temperature coefficient of $R_1$. In addition $R_2 + R_1 =$ Resistance 29 at the calibration reference temperature, for bridge balance.

Figure 8:
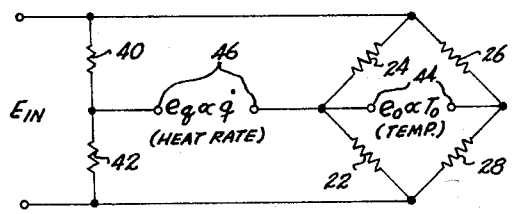
FIGURE 8 is a schematic diagram of a composite circuit incorporating the basic bridge arrangement of FIGURE 6 combined with a modified bridge arrangement, by which both temperature and heating rate may be measured either separately or simultaneously.

Not only may these self-compensating transducer assemblies be used to measure temperature, but they may also be applied to heating rate measurements. In FIGURE 8 a combined bridge circuit is shown which accomplishes this result using the multiple resistance grid combination and bridge circuit of FIGURES 5 and 6 respectively. A second bridge circuit is formed employing two additional resistances, 40 and 42 connected serially across the input terminals to which input voltage $E_{in}$ is applied. The first set of output terminals 44 provides a voltage $e_0$ proportional to measured temperature $T_0$ and a second set of output terminals 46 respectively connected to the junction of resistances 40 and 42 and that of resistances 22 and 24 provides a voltage $e_q$ proportional to heat flux or heating rate $\dot{q}$. It may be shown mathematically and demonstrated in practice that the output voltage $e_q$ is equal to a function of heating rate and the calibrated or known values of temperature sensitive resistances 22 and 24.

Figure 9:
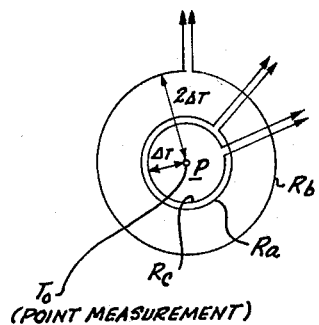
FIGURE 9 is a simplified diagram showing a multiple transducer element configuration for measuring temperature at a selected point P.

FIGURE 9 illustrates a substantially coplanar arrangement of circularly formed concentric temperature sensitive resistances by which temperature $T_0$ at a central point P may be measured accurately employing principles of the invention. The resistances $Ra$ and $Rc$ are formed with substantially the same diameter and correspond to resistances 24 and 28 in FIGURE 5, both separated from point P by thermal impedance of a certain value. Resistor $Rb$, corresponding to resistance 22, is larger in diameter and is thus separated by a greater impedance from point P, giving rise to a temperature gradient error $2\Delta T$ in this example which is twice that, $\Delta T$, of resistances $Ra$ and $Rc$. The same bridge circuit connections may be employed here as in FIGURE 6 to obtain direct temperature readings on a galvanometer or other metering device. FIGURES 10 and 11 show equivalent physical transducer arrangements for measuring respective temperatures on the exterior and interior of cylindrical objects.

In these various forms and applications of the invention an important benefit is obtained of rapid response when compared with conventional resistance thermometers, for example. This comparison is graphically portrayed in FIGURE 12 and is due to the fact that thermal gradient error is eliminated from the measurements so that only thermal diffusion time is involved in creating a lag between application of heat flux and response of the system in terms of indicating temperatures, and by making the diffusion time for the sensors equal the transient responsiveness of the system is made maximum.

Another application for the invention appears in FIGURE 13, employing thermocouples in this case rather than temperature sensitive resistances. In this figure two dissimilar "hot" junctions 48 and 50 are shown in a common transducer head 52 mounted on a surface S for measurement of surface temperature $T_0$. Junction 48 comprises two dissimilar metals such as alumel and constantan, for example, whereas junction 50 comprises dissimilar metals such as constantan and chromel. These junctions are connected in differential relationship in series with an external measuring device such as a galvanometer 54 the connections for which serve as a "cold" junction common to the serially connected junctions 48 and 50. The output voltage $e_0$ measured by galvanometer 54 is defined by the following:

$$e_0 = Me + M\Delta e - e - K\Delta e$$

where M is the ratio of thermoelectric sensitivity of junction 50 to that of junction 48 and $\Delta e$ is the error response of junction 50 due to a thermal gradient $\Delta T$ across the thermal impedance separating it from surface S. By making K equal to M, and both equal to two, $$e_0 = e$$

from which $T_0$ may be calculated as follows:

$$T_0 = \frac{e_0}{B - C}$$

where B is the thermoelectric sensitivity of thermocouple junction 50 and C is the thermoelectric sensitivity of thermocouple junction 48.

In FIGURES 14 and 15 compensated thermal measurement by use of three thermal junctions 56, 58 and 60 in thermal contact with absorption surfaces $S_1$, $S_2$ and $S_3$ is effected. These junctions produce voltages $e_1$, $e_2$ and $e_1$, respectively in response to heat flux $\dot{q}$ from a source at temperature $T_s$, and the surfaces $S_1$, $S_2$ and $S_3$ are adjusted as to their overall thermal transfer coefficients $h_1$, $h_2$ and $h_1$ by choice of relative surface emissivity and/or view (reception angle), such that the differential output voltage $e_0$ is made proportional to $T_s$. In effect one of the thermal junctions, such as 56, having an overall thermal transfer coefficient is compensated for the error effect caused by such coefficient through use of compensating junctions having offsetting error effects by appropriate choice of their respective coefficients and their effective thermoelectric sensitivities involving the characteristics of the respective absorption surfaces with which they make contact. To do this $h_1$ is made equal to $2h_2$ and $e_1$ and $e_2$ are made equal. Thus $$e_0 = e - \Delta e - e + 2\Delta e + e - \Delta e$$

or $$e_0 = e, \text{ when } \dot{q}=0, \; \dot{q}>0, \; \dot{q}<0$$

where $e$ corresponds to the unknown temperature $T_s$. In regard to the above explanation it will be recognized that overall thermal transfer coefficients are the inverse of the respective thermal impedances of the elements.

In FIGURE 16A a modified thermocouple combination is provided to measure temperature $T_0$ of surface S by separating thermal junction 62 from the surface by three times the thermal impedance separating the junctions 64, 66 and 68 from the surface, as shown. Junctions 62 and 64 are electrically connected in parallel through the respective thermocouple junctions 66 and 68 as depicted in the equivalent circuit diagrams of FIGURE 17A. The schematic shown in FIGURE 17B illustrates the relationship of junction voltages and resistances. The combined output voltage is expressed as $$e_0 = E_{64} - \frac{(E_{64} - E_{66} + E_{62} - E_{68})R_{64}}{R_{64} + R_{66}}$$

or $$e = e + \Delta e - \frac{(e + \Delta e - e - \Delta e + e + 3\Delta e - 3 - \Delta e)R_{64}}{R_{64} + R_{66}}$$

where $E_{62}$, $E_{64}$, $E_{66}$ and $E_{68}$ are the voltages generated by the respective junctions, $e$ is the portion of voltage of each junction due to the temperature of the junction, equal for all junctions, $\Delta e$ is the voltage error component of each junction due to a given thermal impedance value, representing that of junction 64 (or 66 or 68), and $R_{64}$ and $R_{66}$ are the electrical resistances of junction conductors of respective junctions 64 and 66. At equilibrium, $e_0 = e$. If $R_{64}$ is made equal to $R_{66}$ the transient heating and cooling output voltage $e_0$ is also equal to $e$. Current flow in the loop formed by the serially connected junctions effects compensation in this case.

In the embodiment of FIGURE 16B there are three thermocouple junctions employing respectively different combinations of three dissimilar metals, in this case constantan, alumel and chromel. The chromel-alumel junction 70 is separated from surface S by a thermal impedance $K'\Delta X$, whereas the alumel-constantan junction 72 and the constantan-chromel junction 74 are separated from the surface by a thermal impedance $\Delta X$. It may be shown in this embodiment also that a proper balancing of the variables in the transducer head design will result in a response characteristic wherein, at equilibrium, the output voltage $e_0$ is proportional to surface temperature $T_0$ being measured.

Figure 18:
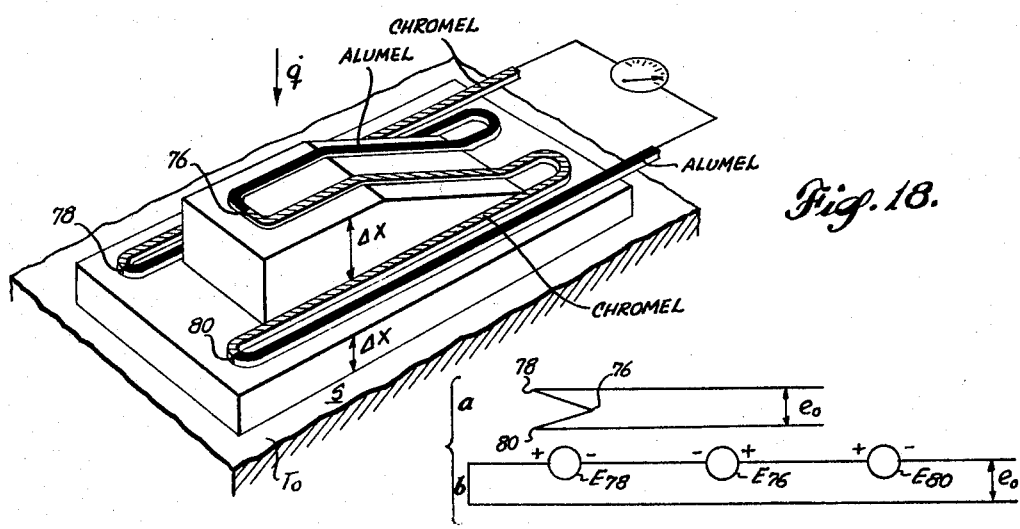
FIGURE 18 is an isometric view of a modified multiple thermal junction transducer arrangement using the principle of voltage compensation as between the thermal junctions in order to compensate for thermal gradient of a primary junction in the transducer.
Figure 19:
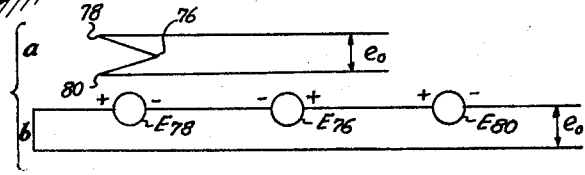
FIGURE 19 shows the equivalent circuit diagrams of the transducer arrangement of FIGURE 18.

In the form shown in FIGURE 18 a voltage compensation arrangement is provided, in this case employing a combination of thermal junctions of two dissimilar metals, such as chromel and alumel. The junction 76 in this case is separated from surface S by a thermal impedance proportional to twice the thickness $\Delta X$, and the similar junctions 78 and 80, serially connected with junction 76, are separated from surface S by thermal impedance proportional to $\Delta X$. The equivalent circuit appears in FIGURE 19A and its schematic representation in FIGURE 19B. It will be seen that the output voltage $e_0$ in this case is expressed as follow:

$$e_0 = E_{78} - E_{76} + E_{80}$$

or $$e_0 = e + \Delta e - e - 2\Delta e + e + \Delta e$$

so that whether $$\dot{q}=0, \text{ or } \dot{q}>0, \text{ or } \dot{q}<0$$

$e_0$ will be equal to $e$ and compensated for thermal gradients in relation to the surface.

These and other aspects of the invention will be recognized by those skilled in the art, from the foregoing description of the presently preferred embodiments.

I claim as my invention:

1. An instrument for measuring temperature of a medium comprising first and second thermoelectric elements of predetermined relative thermal capacities, means supporting and presenting the respective elements in thermal transfer relationship to the medium with respectively different overall thermal transfer coefficients in relation to the medium, whereby one element senses temperature of the medium with an error differing from the sensing error of the other element, and circuit means electrically combining the responses of the elements differentially with a relative weighting which results in mutual cancellation of such errors and produces an output corresponding to temperature of the medium, the product of thermal capacity and thermal impedance of the elements being substantially equal.

2. An instrument for measuring temperature, of a medium comprising first and second thermoelectric elements of predetermined relative thermal capacities, means supporting and presenting the respective elements in thermal transfer relationship to the medium with respectively different thermal impedances in relation to the medium, whereby one element senses temperature of the medium with an error differing from the sensing error of the other element, and circuit means electrically combining the responses of the elements differentially with a relative weighting which results in mutual cancellation of such errors and produces an output corresponding to temperature of the medium, the said means supporting and presenting the respective elements having such thermal characteristics in relation to the thermal capacities of the elements as to substantially equalize their respective heat diffusion times in response to a change of temperature of the medium.

3. An instrument for measuring temperatures of a medium comprising first and second thermoelectric elements, temperature sensors separated from the medium by respective barriers having different thermal impedances, whereby the temperature gradients between the medium and the respective sensors differ in predetermined ratio, said temperature sensors having predetermined temperature sensitivities, and circuit means electrically combining the responses of the elements differentially with a relative weighting which results in mutual cancellation of such errors and produces and output corresponding to temperature of the medium, said sensors having respective predetermined thermal capacities, the ratios of which is the inverse of the ratio of the respective corresponding impedances of the sensors.

4. The method of measuring a thermal condition by thermal sensing means having predetermined thermal capacity and subject to a thermal impedance which introduces a sensing error factor into the measurement, comprising the steps of substantially simultaneously presenting to the same thermal condition a separate thermal sensing means having predetermined thermal capacity and a thermal response characteristic bearing a known relationship to that of the first-mentioned sensing means and having a thermal impedance the product of which with the thermal capacity of this sensing means approximately equals the similar product of the first-mentioned sensing means, said separate sensing means having a thermal impedance causing a resulting sensing error factor differing from that of the first-mentioned sensing means but which bears a known relationship thereto, and combining the outputs of the two sensing means differentially with a relative weighting which causes mutual cancellation of said error factors and a net response related to known manner to the thermal condition being measured.

5. The method of measuring temperature of a surface by thermal sensing means having predetermined thermal capacity and separated from said surface by a thermal impedance which produces a temperature gradient between the sensing means and surface introducing an error factor into the measurement, comprising the steps of substantially simultaneously presenting to the same surface a separate thermal sensing means having predetermined thermal capacity and a thermal response characteristic bearing a known relationship to that of the first-mentioned sensing means and separated from the surface by a thermal impedance, causing a resultant temperature gradient and sensing error factor, differing from that of the first-mentioned sensing means but which bears a known relationship thereto, the product of thermal capacity and thermal impedance of one sensing means being substantially equal to the similar product of the other sensing means, and combining the outputs of the two sensing means differentially with a relative weighting which causes mutual cancellation of said error factors and a net response related in known manner to the surface temperature.

6. The method of measuring heat transfer rate in relation to a selected physical location by thermal sensing means having predetermined thermal capacity and subject to a thermal impedance in relation to said location which introduces a sensing error factor into the measurement, comprising the steps of substantially simultaneously presenting to the same location a separate thermal sensing means having predetermined thermal capacity and a thermal response characteristic bearing a known relationship to that of the first-mentioned sensing means and having a thermal impedance, causing a resultant sensing error factor, differing from that of the first-mentioned sensing means but which bears a known relationship thereto, the product of thermal capacity and thermal impedance of one sensing means being substantially equal to the similar product of the other sensing means, and combining the outputs of the two sensing means differentially with a relative weighting which causes mutual cancellation of said error factors and a net response related in known manner to the heat transfer rate being measured.

7. Thermal measurement apparatus comprising, in combination, means forming primary and compensating measurement channels having respective outputs differentially combinable to indicate a thermal condition being measured, said primary channel comprising primarly electrically responsive temperature sensitive transducer means having a thermal impedance introducing temperture gradient error $\Delta T$ with respect to the thermal condition being measured thereby and producing an output electrical response to said condition of $Me+M\Delta e$, where $e$ is proportional to the condition being meansured, and $\Delta e$ is the measurement error due to $\Delta T$, said compensating channel comprising compensating electrically responsive temperature sensitive transducer means having a thermal impedance introducing a temperature gradient error $K\Delta T$ with respect to said thermal condition being measured thereby and producing an output electrical response to said condition of $e+K\Delta e$, where K is a known quantity, and primary and compensating channels having known respective gains $G_1$ and $G_2$, whereby the differential sum of the two channel outputs equals $G_1Me+G_1M\Delta e-G_2e-G_2K\Delta e$, said apparatus being further characterized by the following relationships, substantially:

$G_1M=G_2K$,
$G_1M-G_2=N$, a known quantity,

K is the ratio of the thermal impedance of the compensating channel transducer means to the thermal impedance of the primary channel transducer means, and M is the ratio of thermoelectric sensitivity of the primary channel transducer to thermoelectric sensitivity of the compensating channel transducer and M is equal to K, permitting computation of $e$ and thereby of the thermal condition.

8. Thermal measurement apparatus comprising, in combination, means forming primary and compensating measurement channels having respective outputs differentially combinable to indicate a thermal condition being measured, said primary channel comprising primary electrically responsive temperature sensitive transducer means having an overall thermal transfer coefficient introducing temperature gradient error $\Delta T$ with respect to the thermal condition being measured thereby and producing an output electrical response to said condition of $Me+M\Delta e$, where $e$ is proportional to the condition being measured, and $\Delta e$ is the measurement error due to $\Delta T$, said compensating channel comprising compensating electrically responsive temperature sensitive transducer means having a thermal impedance introducing a temperature gradient error $K\Delta T$ with respect to said thermal condition being measured thereby and producing an output electrical response to said condition of $e+K\Delta e$ where M and K are known quantities, said primary and compensating channels having known respective gains $G_1$ and $G_2$, and means differentially combining the output of the respective channels to produce an electrical output proportional to the summation $$G_1Me+G_1M\Delta e-G_2e-G_2K\Delta e$$

said apparatus being further characterized by the following relationships substantially:

$G_1M=G_2K$,
$G_1M-G_2=N$, a known quantity,

K is the ratio of the thermal impedance of the compensating channel transducer means to the thermal impedance of the primary channel transducer means, and M is equal to K, M being the ratio of thermoelectric sensitivity of the primary channel transducer to the thermoelectric sensitivity of the compensating channel transducer, whereby the combined output bears a known relationship to the primary transducer means electrical response $e$, compensated for the response error $\Delta e$.

9. Thermal measurement apparatus comprising two temperature sensitive electrical transducer devices having predetermined thermal capacities, respectively different electrical response sensitivities to temperature, and having thermal impedances the ratio of which is substantially the inverse of the ratio of their respective electrical response sensitivities, with the product thermal capacity and thermal impedance of one device being substantially equal to the similar product of the other device, and means to present said two transducer elements to the same temperature condition to be measured.

10. Thermal measurement apparatus comprising two temperature sensitive electrical transducer devices having predetermined thermal capacities, respectively different electrical response sensitivities to temperature and having thermal impedances the ratio of which is substantially the inverse of the ratio of their respective electrical response sensitivities, with the ratio of the respective thermal capacities of such devices being substantially equal to the inverse ratio of their respective thermal impedances, means to present said two transducer elements to the same temperature condition to be measured, and electrical means connected to the two transducer devices for detecting the difference of the responses thereof.

11. The apparatus defined in claim 9, wherein the electrical means comprises a bridge circuit having four arms, with one of said resistance means included in one arm and with the other of said resistance means included partly in a second arm and partly in a third arm of the bridge circuit.

12. A thermoelectric transducer device for making thermal measurements with respect to a selected physical location, comprising three temperature-sensitive electric transducer elements, means supporting said elements in predetermined relationship adapting one to be separated from said measurement location by a thermal impedance which is greater than the thermal impedance separating the other two from said location, said one element having a thermal capacity the product of which multiplied by its thermal impedance substantially equals the product of thermal capacity of either of the other two elements multiplied by its thermal impedance, said other two elements having substantially equal thermal capacity.

13. Themoelectric transducer apparatus for making thermal measurements with respect to a selected physical location, comprising three temperature-sensitive electric transducer elements, means supporting said elements in predetermined relationship for placement thereof with one separated from said measurement location by a thermal impedance which is greater than the thermal impedance separating the other two from said location, said one element having a thermal capacity the product of which multiplied by its thermal impedance substantially equals the product of thermal capacity of either of the other two elements multiplied by its thermal impedance, said other two elements having substantially equal thermal capacity, and circuit means electrically interconnecting said transducer elements in a temperature measurement circuit having parameters operatively associated with said difference of thermal impedances to compensate for heat transfer in relation to said location.

14. Thermoelectric transducer apparatus for making thermal measurements with respect to a selected physical location, comprising three temperature-sensitive electric transducer elements, means supporting said elements in predetermined relationship for placement thereof with one separated from said measurement location by a thermal impedance which is greater than the thermal impedance separating the other two from said location, said one element having a thermal capacity the product of which multiplied by its thermal impedance substantially equals the product of thermal capacity of either of the other two elements multiplied by its thermal impedance, said other two elements having substantially equal thermal capacity, and circuit means electricaly interconnecting said transducer elements in a measurement circuit having parameters operatively associated with said difference of thermal impedances to measure heat transfer in relation to said location.

15. The apparatus defined in claim 14, wherein the transducer elements comprise temperature sensitive impedances and the circuit means comprises two bridge circuits, one such bridge circuit including said three transducer elements in three of its arms, respectively, and the other such bridge circuit including in two of its arms, respectively, said one transducer element and one of said other two transducer elements, the two bridge circuits including separate sets of output terminals, those of the first bridge circuit providing an output signal representing temperature and those of the second bridge circuit providing an output signal representing heat transfer rate, both with respect to said measurement location.

16. Means for making thermal measurements with respect to a solid surface subject to heat transfer to or from said surface through the space adjacent thereto, comprising first, second and third temperature sensitive resistances, of flat grid-like form, the first and third resistances being mounted in side-by-side relationship on said surface with predetermined value of thermal impedance separating each from the surface, and the second resistance being mounted on said surface with at least approximately twice said value of thermal impedance separating it from the surface, a first bridge circuit means including a voltage input, said first and second resistances being connected serially across said input to form respectively two arms of the bridge, said third resistance and a separate fourth resistance being connected serially across said input to form respectively the remaining two arms of the bridge, and including means to measure bridge unbalance as a measure of surface temperature, and a second bridge circuit including two arms of the first bridge and separate fifth and sixth resistances connected serially across said input and means to form respectively its remaining two arms, and means to measure unbalance of the second bridge as a measure of surface heat transfer rate.

17. Thermoelectric transducer means for making thermal measurements with respect to a solid surface subject to heat transfer to or from said surface through the space adjacent thereto, comprising first thermocouple junction means separated from said surface by a predetermined thermal impedance, second thermocouple junction means separated from said surface by a greater thermal impedance, and circuit means electrically connecting said first and second thermocouple junction means in shunt, said circuit means comprising third and fourth thermocouple junction means, said third and fourth thermocouple junction means being polarized additively in relation to each other and subtractively with relation to said first thermocouple junction means, and output means connected to said third and fourth thermocouple junction means.

References Cited by the Examiner

UNITED STATES PATENTS

| | | |
|---|---|---|
| 2,493,651 | 1/1950 | Boelter et al. |
| 2,798,377 | 7/1957 | Brownlee et al. |
| 3,049,012 | 8/1962 | Daniels _____ 73—359 |
| 3,095,743 | 7/1963 | Teasel et al. _____ 73—340 |
| 3,139,752 | 7/1964 | Giedt _____ 73—341 X |

LOUIS R. PRINCE, *Primary Examiner.*

STEVEN H. BAZERMAN, *Assistant Examiner.*